Aug. 21, 1962   L. MARKOFF-MOGHADAM   3,049,770
SAFETY CLIP
Filed Oct. 4, 1961   3 Sheets-Sheet 1
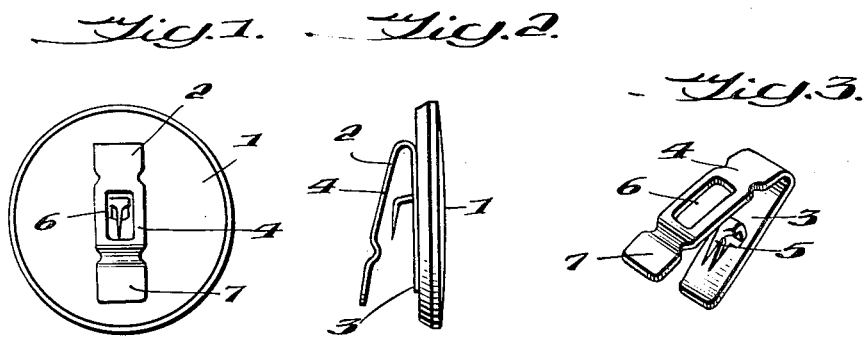
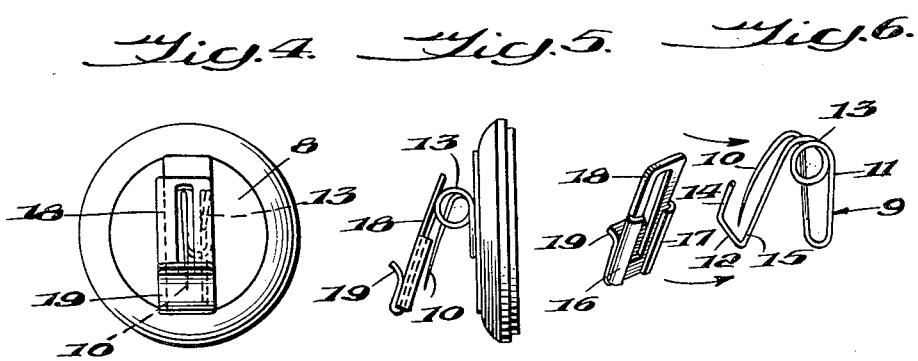
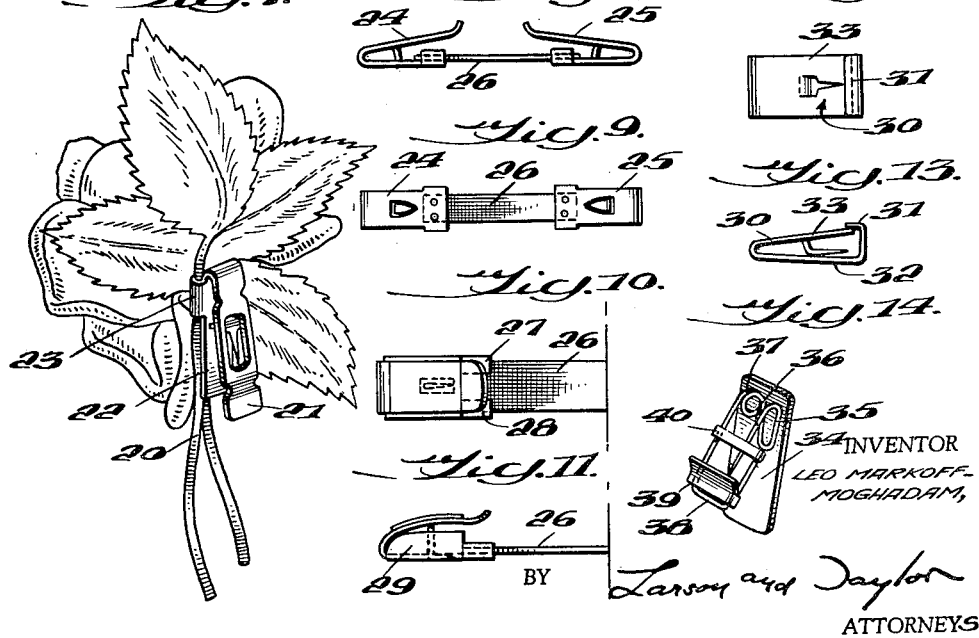
INVENTOR
LEO MARKOFF-
MOGHADAM,
BY Larson and Taylor
ATTORNEYS

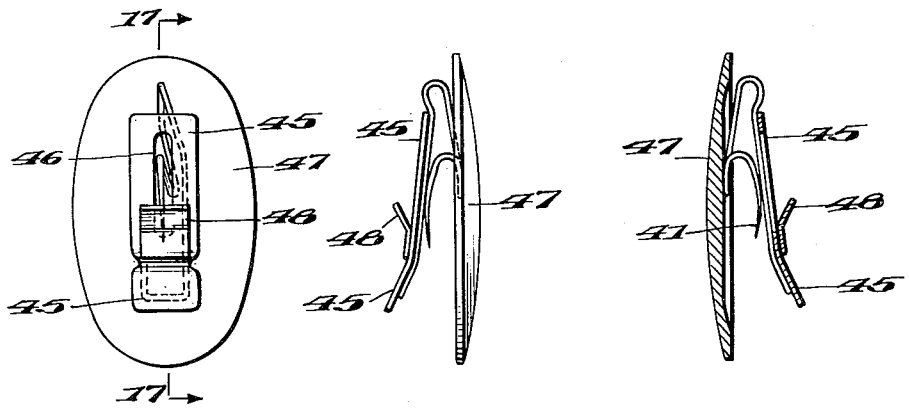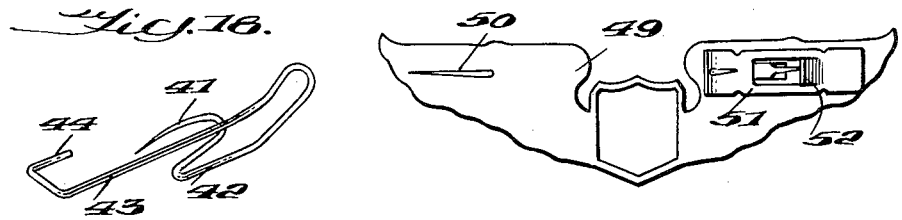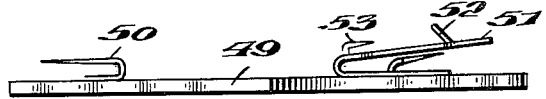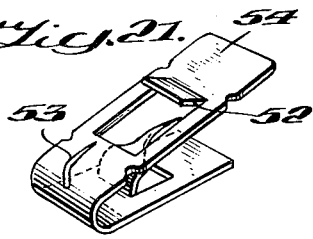

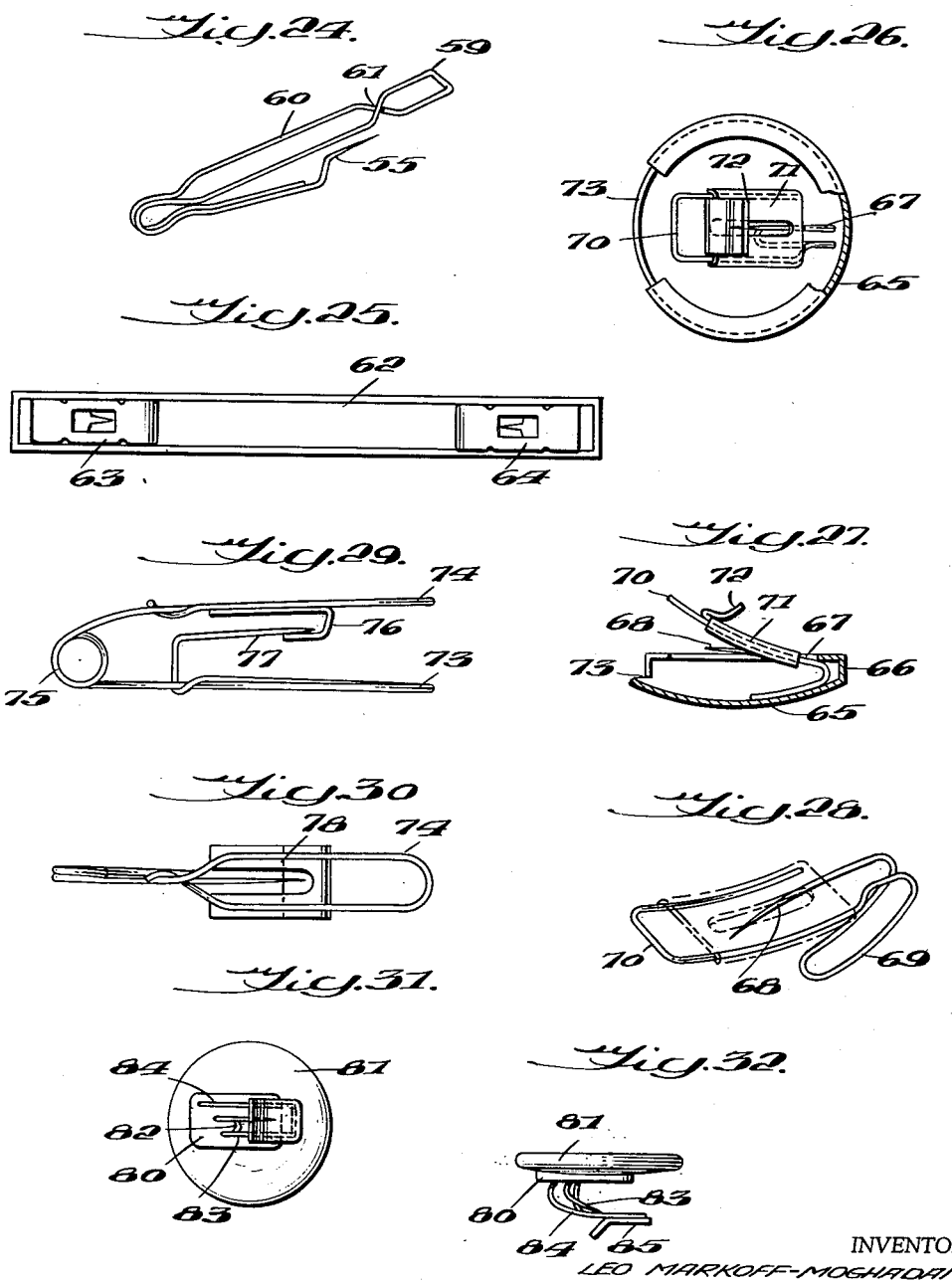

United States Patent Office 3,049,770
Patented Aug. 21, 1962

3,049,770
SAFETY CLIP
Leo Markoff-Moghadam, 2938 Newark St. NW.,
Washington, D.C.
Filed Oct. 4, 1961, Ser. No. 142,947
6 Claims. (Cl. 24—13)

This invention relates to a clip and more particularly to a fastening device which combines the ease of fastening of an ordinary straight pin with the security advantages of a safety pin. The present application is a continuation-in-part of my earlier applications Serial No. 40,457, filed July 1, 1960, and application Serial No. 70,325, filed November 18, 1960, both now abandoned.

Fastening devices used heretofore, particularly in connection wtih costume jewelry and the like, badges and similar devices requiring a ready means for attaching the object to a garment usually comprise ordinary straight pins or a fastener similar to a safety pin. Straight pins provided means for expeditiously fastening an object to a garment and, of course, such pins are most inexpensive. However, there is no locking means and the fastened object may become disengaged from the fabric quite readily. Fasteners similar to safety pins have also been used and such fasteners do provide adequate protection against inadvertent removal. However, such fasteners are difficult to manipulate and are considerably more expensive to produce than ordinary straight pins.

The present invention is designed to incorporate both the ease of use of the straight pin and the locking features of a safety pin into a single relatively inexpensive clip. According to the present invention there is provided a pair of arms which are resiliently inter-connected and which are preferably formed from a single strip of material. On one of the arms is provided a fabric-engaging member which may be in the form of a pin and on the other of said arms is provided an opening or slot which is preferably provided with a cross-guard extending across one end thereof for purposes which will become more apparent hereinafter. When the arms are pressed together the fabric-engaging element is adapted to extend through the slot and may then be engaged with a garment in the same manner as an ordinary straight pin. When the pin is in the engaged position the arms are released and the pin and fabric are drawn through the slot so as to maintain engagement between the pin and fabric and prevent disengagement therefrom unless the arms are again pressed together.

In the prior art there exists fastening devices having certain of the structural features brought out in the preceding paragraph. For example, in Patent No. 591,835 there is shown a device comprising a pair of resilient arms with a pin mounted on one arm and adapted to extend through a slot on the other arm. However, experimentation has established that such devices do not permanently secure the clip to the fabric. To obtain a locking action between the clip and the fabric there are certain essential structural characteristics of the clip as will be explained more fully hereinafter.

An object of the present invention is to provide a clip which is adapted to be readily engaged with material and which may be locked in engaged position with the material.

Another object of the present invention is to provide a clip having a pair of resilient arms with a material-engaging means on one arm and a slot on the other arm, the relationship between the slot and material-engaging means being such that the material-engaging element extends through the slot when the arms are pressed together so as to engage material and will draw the material through the slot to a locked position when the arms are released.

Other objects and many of the attendant advantages of the present invention will become more readily apparent upon consideration of the following detailed specification in connection with the accompanying drawings wherein:

FIG. 1 is a plan view of a clip according to one embodiment of the present invention,
FIG. 2 is a side elevation of the clip shown in FIG. 1,
FIG. 3 is a perspective view thereof,
FIG. 4 is a plan view of an embodiment utilizing a bent wire to form the arms of the clip,
FIG. 5 is a side elevation of the clip shown in FIG. 4,
FIG. 6 is an exploded view of the clip as shown in FIGS. 4 and 5,
FIG. 7 is a perspective view of an embodiment of the clip applied to artificial flowers,
FIG. 8 is a side elevation of a pair of clips with interconnecting means for fastening bandages,
FIG. 9 is a plan view of the device shown in FIG. 8,
FIG. 10 is a plan view of another embodiment of the fastening device shown in FIG. 8,
FIG. 11 is a side elevation of the clip shown in FIG. 10,
FIG. 12 is a plan view of a medical clip,
FIG. 13 is a side elevational view thereof,
FIG. 14 is a perspective view of another form of the clip device,
FIG. 15 is a plan view of the form of the clip applied to a brooch,
FIG. 16 is a side elevational view thereof,
FIG. 17 is a sectional view along the lines 17—17 of FIG. 15,
FIG. 18 is a perspective view of one of the elements of the embodiment of the clip shown in FIGS. 15 to 17,
FIG. 19 is a plan view of a form of the clip applied to a military insignia,
FIG. 20 is a side elevation of the device shown in FIG. 19,
FIG. 21 is a perspective view of the clip shown in FIGS. 19 and 20.
FIG. 22 shows an embodiment of the clip made from a single piece of wire applied to a decorative bar,
FIG. 23 is a side elevational view of the device shown in FIG. 22,
FIG. 24 is a perspective view of the clip according to FIGS. 22 and 23,
FIG. 25 is a plan view of a pair of clips applied to military service ribbons,
FIG. 26 is an embodiment of the clip which may be used as a diaper fastening device,
FIG. 27 is a sectional view of the clip shown in FIG. 26,
FIG. 28 is a perspective view of the clip according to FIGS. 26 and 27,
FIG. 29 is a side elevation of still another embodiment of the invention,
FIG. 30 is a plan view of the clip shown in FIG. 29,
FIG. 31 is an embodiment of the clip applied to a button, and
FIG. 32 is a side elevational view of the clip shown in FIG. 31.

Referring now more specifically to the drawings wherein like numerals indicate like parts throughout the several views there is shown at 1 in FIG. 1 a piece of costume jewelry, brooch or the like having a clip 2 according to the present invention secured to the rear face thereof in any suitable manner. The clip comprises a pair of arms 3 and 4 which are formed from an integral piece of material such as, for example, a resilient metal. Pressed from the arm 3 is a fabric-engaging element or pin 5 and a slot 6 is cut from the arm 4. The arm 4 is also provided with a finger-engaging portion 7. When the finger-engaging portion 7 is pressed towards the arm 3 the pin or prong 5 passes through the slot 6 so as to be in an exposed position to engage fabric or material to which the member 1 is to be fastened. The pin is engaged with the fabric and the arm 4 released so that the pin with the fabric engaged therewith passes back through the slot 6 to retain the fabric in engagement with the clip and lock it firmly in engaged position until such time as the element 4 is again impressed so that the fabric can be released from the pin 5.

In order to lock the fabric in engagement with the clip the latter must pull the fabric into the slot and maintain the fabric between the two arms when the resilient arm 4 is released to return to its normal position. For this reason the height of the prong or pin 5 must be considerably less than the distance between the arms 3 and 4 when the arms are in the normal position shown in FIG. 3. The pin 5 must extend in a direction away from the interconnecting portion of the arms 3 and 4. The gap between the end of the pin and the end portion of the slot 6 must be substantially zero. That is to say, the end of the pin must practically engage the end of the slot when the arms are pressed together.

FIGS. 4 to 6 inclusive disclose another embodiment of the present invention applied to the rear face of a brooch or emblem 8. The clip according to this embodiment comprises a wire 9 which is bent to form a pin portion 10, arm 11 and arm 12 with the arms interconnected by an integral spring portion 13. The arm 12 is bent to form substantially parallel side portions 14 and 15 and these side portions 14 and 15 are adapted to be engaged by flanges 16 and 17 of a slotted plate 18. The plate 18 is provided with a cross-guard 19 which is formed as a reversely bent end portion of the plate. It can be seen that this cross-guard has a portion which serves as a finger-engaging portion and an outwardly curved end part which extends from the end of the slot angularly so as to overlie the end portion of the slot. This latter portion of the cross-guard extends to close adjacency with the end portion of the pin 10 when the arm 12 is depressed. This cross-guard functions to retain the fabric engaged with the pin 10 in locked position so that the fabric cannot possibly become disengaged with the pin until such time as the arm 12 is depressed to pass the pin portion 10 through the slot in the plate 18. The engagement between the fabric and the clip with the embodiment of the invention having this cross-guard is as secure against inadvertent removal as is the conventional safety pin.

In FIG. 7 there is shown an embodiment of the invention as applied to artificial flowers or a corsage 20. The clip device shown is similar to the embodiment of the invention shown in FIGS. 1 to 3 and the lower arm 22 is secured to the corsage by integral tabs 23 which extend from each side of the arm 22. These tabs are bent around the stems of the flowers so as to firmly engage the clip 21 therewith. The corsage may then be securely fastened to a garment by impressing the outer arm so that the pin extends through the slot and engaging the pin with the garment and releasing the arm to lock fabric in engaged position.

In FIG. 8 there is shown an embodiment of the invention which is useful in connection with securing bandages and the like. According to this embodiment there are provided a pair of clips 24 and 25 which are inter-connected by an elastic element 26. The elastic may be secured to the clip by means of tab portions 27 and 28 (FIG. 10) which are integral with an arm of the clip and are reversely bent to engage the end portion of the elastic element. The clip may have upwardly extending side flanges such as shown at 29 in FIG. 11. The fastening device is used to secure a bandage in the following manner. A roll of gauze is wrapped around an arm, for example, to form a bandage and the free end portion of the gauze is normally engaged with the bandage by adhesive tape or by simply tying the gauze in place. According to the present invention one of the clips 24 and 25 is secured to the free end portion of the gauze and the elastic stretched and the other clip secured to the wrapped gauze. Thus, the gauze is drawn tightly to form a firm bandage and the fastening device may be readily removed when it is desired to replace or remove the bandage. The fastening device may be applied with one hand and it can be seen that the pin portions extend in opposite directions so that the elastic element 26 tends to draw the clips into firmer engagement with the gauze.

In FIGS. 12 and 13 there is shown another embodiment of the invention which is useful in connection with securing bandages and the like. The clip 30 is provided with an upwardly extending flanged portion 31 on the arm 32 which extends over the end portion of the arm 33 to retain the arm 33 in the position shown. The flange 31 prevents the inadvertent pressing together of the arms 32 and 33 so as to release the material engaged with the pin when the clip is in the locked position.

In FIG. 14 there is shown an embodiment of the clip comprising a wire bent to form a pin portion 36, U bend 35, spring portion 37 and arm portion 38. The U-shaped bend 35 is secured to a plate 34 which may comprise a piece of costume jewelry, brooch or the like. The arm 38 has cross-guard 39 secured thereto and a slot-forming element 40. When the arm 38 is depressed the pin 36 extends between the bar 40 and the cross-guard 39 to permit the pin to become engaged with the fabric. It will be noted that the crossguard 39 has an upstanding end portion thereon which performs the function of securely locking the fabric in engagement with the pin in the same manner as the cross-guard 19 shown in the embodiment of FIGS. 4 to 6.

In FIGS. 15 to 18 inclusive there is shown an embodiment of the invention wherein an integral wire is bent to form a pin portion 41, a U-bend securing portion 42 and an arm 43 having a flanged end portion 44. A plate 45 may be secured to the arm 43, the plate 45 having a slot 46 therein and the U-shaped portion 42 may be secured to the rear face of a brooch or other emblem 47. A cross-guard 48 may be secured to the plate 45 adjacent the end of the slot and this cross-guard extends in a direction away from the plane of the plate 45 at an angle so that the end of the pin 41 passes in close adjacency with the cross-guard 48 when the resilient arms are pressed together. This cross-guard performs the function of locking the fabric in engagement with the pin to prevent removal therefrom unless the arms are pressed together.

FIGS. 19 to 21 inclusive there is shown another embodiment of the invention which is particularly well suited for securing military ribbons and the like to uniforms. The insignia is shown at 49 and is provided with a pin 50 on the rear face thereof which extends towards one end of the insignia. The clip 51 is mounted so that the pins or prongs thereon extend toward the opposite end of the insignia. The clip 51 has a cross-guard 52 and an auxiliary pin 53. The cross-guard 52 is formed integrally with the upper arm 54 of the clip 51 and functions to securely retain the clip in engagement with the fabric. The auxiliary pin 53 also functions to support the insignia on the garment.

In FIGS. 22 to 24 inclusive there is shown an embodiment of the clip wherein the entire clip is formed from a single piece of wire. The wire is bent to form an upstanding pin portion 55, an arm portion 56, an interconnecting spring portion 57 and upper arm 58. It can be seen in FIG. 22 that the upper arm 58 is formed by reversely bending the wire into a figure 8 shape. The end loop 59 forming a finger-engaging portion and the loop portion 60 forming a slot to receive the pin 55 when the arm 58 is depressed. The wire is bent so that the end portion of the pin 55 passes in close adjacency to the cross-over point 61 forming the end portion of the slot in the upper arm. The arm 56 may be secured as by soldering or the like to the rear face of a tie clip, brooch or the like.

In FIG. 25 there is shown an embodiment of the invention which is particularly adapted for securing military service ribbons to a uniform. There is shown the rear face of a series of service ribbons 62 and clips 63 and 64 are applied to the ends thereof. It can be seen that the points of the pins extend towards the center of the service ribbon and these clips may be of the type shown in FIGS. 1 to 3.

In FIGS. 26 to 28 inclusive there is shown an embodiment of the invention which is particularly well suited for securing diapers and the like. An enlarged decorative button 65 having flanged edge portions 66 has a clip 67 secured to the rear face thereof. The clip 67 comprises a wire bent to form a pin portion 68 and a U-shaped button-engaging portion 69 and a flanged upper arm portion 70. The upper arm 70 has a slotted plate 71 mounted thereon, the plate 71 having cross-guard integral therewith. The button 65 has a cut-out portion 73 which permits the resilient arm 70 to be engaged by the fingers and depressed to expose the pin 68 for locking engagement with the diaper material. It can be appreciated that the present invention has many advantages as a securing means for diapers. There is no possibility of inadvertent exposure of the pin 68 such as might injure the infant. The diapers remain securely engaged with the clip pin until such time as the arm 70 is depressed by the fingers. The pin may be both engaged and disengaged with the diapers with one hand.

In FIGS. 29 and 30 there is shown an embodiment of the invention wherein the arms of the clip 73 and 74 are urged into spaced apart position by the inter-connecting spring 75. The arms are retained in the position shown by a locking member 76 which engages the underside of the pin 77 to prevent the arms 73 and 74 from moving into further spaced apart position. The locking element 76 is formed integrally with the plate portions 78 which provides a slot for passage of the pin 77.

In FIGS. 31 and 32 an embodiment of the invention which is particularly useful in securing buttons onto garments is disclosed. There is provided a plate 80 which may be secured to the rear face of a button 81. Secured as by soldering or the like to the rear face of plate 80 is a pin 82 which may be the end portion of an integral wire forming the side members 83 and 84 of the arm of the clip. Soldered to the arms 83 and 84 is a cross-guard member 85 which has an upstanding end portion disposed closely adjacent the end of the pin 83. When the cross-guard and arms 83 and 84 are depresed the pin 83 is exposed between the arms 83 and 84 so as to be in a position to engage the garment. The arms 83 and 84 and cross-guard 85 form a slot similar to the slot formed in one of the arms of the other embodiments of the invention discolsed herein. It can be appreciated that the clip pin disclosed herein as applied to buttons permits buttons to be readily secured to and removed from garments.

Obviously many modifications and variations of the present invention are possible in light of the above teachings. What is claimed is new and desired to be secured by Letters Patent is:

1. A clip comprising an integral wire bent to form a pin at one end thereof, an intermediate U-shaped base portion, a spring means and an upper arm integral with said spring means and base portion, spaced bars on said upper arm forming a slot therebetween, said pin having the free end extending towards the free end of said upper arm, said pin having the free end portion adapted to extend through the slot with substantially no clearance between the end of the pin and the end of the slot when the arm is urged toward the base portion, said pin adapted to engage fabric when extended through the slot and the engaged fabric being drawn through the slot in said arm when the arms are released so as to lock the fabric in engagement with the clip.

2. A clip according to claim 1 wherein one of said bars comprises a cross pin having a portion thereof extending substantially normally with respect to the plane of the upper arm.

3. In combination, a generally U-shaped clip for costume jewelry and the like comprising a pair of arms resiliently interconnected and normally in a spaced apart position, there being an elongated slot in one of said arms, and a pin rigidly secured to said other arm, a cross-guard on said one arm at that end of the slot adjacent the free end of said pin, said cross-guard having a portion thereof extending angularly from said arm and overlying the end portion of the slot and pin, said pin having the free end portion adapted to extend through the slot in close adjacency with the cross-guard with substantially no clearance between the end of the pin and the end of the slot when said pair of arms is urged together, said pin adapted to engage fabric when the pin is extended through the slot beyond the cross-guard when the arms are brought together and the engaged fabric being drawn through the slot in said arm and over the cross-guard when the arms are released so as to lock the fabric in engagement with the clip to prevent the fabric from slipping from the clip.

4. In combination, a fastener for bandages and the like comprising a pair of generally U-shaped clips interconnected by an elastic element, each of said clips comprising a pair of arms resiliently interconnected and normally in a spaced apart position, there being an elongated slot in one of said arms, a pin rigidly secured to said other arm, a cross-guard on said one arm at that end of the slot adjacent the free end of said pin, said cross-guard having a portion thereof extending angularly from said arm and overlying the end portion of the slot and pin, said pin having the free end portion adapted to extend through the slot in close adjacency with the cross-guard with substantially no clearance between the end of the pin and the end of the slot when said pair of arms is urged together, said pin adapted to engage fabric when the pin is extended through the slot beyond the cross-guard when the arms are brought together and the engaged fabric being drawn through the slot in said arm and over the cross-guard when the arms are released so as to lock the fabric in engagement with the clip to prevent the fabric from slipping from the clip.

5. In combination, a generally U-shaped clip for costume jewelry and the like comprising a pair of arms resiliently interconnected and normally in a spaced apart position, there being an elongated slot in one of said arms, a pin rigidly secured to said other arm, a cross-guard on said arm at that end of the slot adjacent the free end of said pin, said cross-guard having a portion thereof extending angularly from said arm and overlying the end portion of the slot, said pin means having the free end portion extending substantially parallel with respect to the plane of said other arm and extending towards the free ends of said arms, said pin having the free end portion adapted to extend through the slot in close adjacency with the cross-guard with substantially no clearance between the end of the pin and the end of the slot when said pair of arms is urged together, said pin adapted to engage fabric when the pin is extended through the slot beyond the cross-guard when the arms are brought together and the engaged fabric being drawn through the slot in said arm and over the cross-guard when the arms are released so as to lock the fabric in engagement with the clip to prevent the fabric from slipping from the clip.

6. A generally U-shaped clip for securing a button to a garment comprising a wire bent to form a pin and a base portion with a pair of supporting arms substantially parallel to said pin, said base portion adapted to be secured to the rear face of a button, a cross-guard secured to said pair of supporting arms, said cross-guard having an angular outwardly extending portion overlying the end portion of the pin, said cross-guard being disposed in close adjacency with the end of the pin when said pair of arms is pressed together to cause the pin to pass therebetween, said pin having the free end thereof extending towards the cross-guard, the pin adapted to engage fabric when extended between the arms beyond the cross-guard when the arms are brought together and the engaged fabric being drawn between the arms and locked in engagement with the pin by the cross-guard when the arms are returned to the normal position thereof.

References Cited in the file of this patent

UNITED STATES PATENTS

| | | |
|---|---|---|
| 325,117 | Schroder | Aug. 25, 1885 |
| 402,685 | Moore | May 7, 1889 |
| 591,835 | Gosewisch | Oct. 19, 1897 |
| 630,579 | Adams | Aug. 8, 1899 |
| 697,936 | Dunham | Apr. 15, 1902 |
| 755,677 | Krus | Mar. 29, 1904 |
| 764,978 | Baugh | July 12, 1904 |
| 1,212,630 | Guillet | Jan. 16, 1917 |
| 1,540,531 | Boswell | June 2, 1925 |
| 1,976,747 | Reuter et al. | Oct. 16, 1934 |
| 2,098,821 | Cook | Nov. 9, 1937 |
| 2,105,725 | Freiberg | Jan. 18, 1938 |
| 2,787,819 | Kaber | Apr. 9, 1957 |

FOREIGN PATENTS

| | | |
|---|---|---|
| 1,133,457 | France | Nov. 19, 1956 |
| 20,711 | Great Britain | May 7, 1889 |